(12) United States Patent
Mirsky et al.

(10) Patent No.: US 8,360,744 B2
(45) Date of Patent: Jan. 29, 2013

(54) COMPRESSOR-EXPANDER SET CRITICAL SPEED AVOIDANCE

(75) Inventors: Saul Mirsky, West Des Moines, IA (US); Wayne Jacobson, Des Moines, IA (US); David J. Hoogerwerf, Des Moines, IA (US); Nauman Islam, Pearland, TX (US)

(73) Assignee: Compressor Controls Corporation, Des Moines, IA (US)

( * ) Notice: Subject to any disclaimer, the term of this patent is extended or adjusted under 35 U.S.C. 154(b) by 1357 days.

(21) Appl. No.: 12/047,938

(22) Filed: Mar. 13, 2008

(65) Prior Publication Data

US 2009/0232663 A1  Sep. 17, 2009

(51) Int. Cl.
*F01D 17/06* (2006.01)
*F03B 15/08* (2006.01)

(52) U.S. Cl. ........... 417/293; 417/428; 417/440; 415/36

(58) Field of Classification Search .................. 415/30, 415/36, 37, 58.5, 58.7; 417/42, 293, 428, 417/440
See application file for complete search history.

(56) References Cited

U.S. PATENT DOCUMENTS

| 5,242,263 | A | * | 9/1993 | Mondoloni | 415/27 |
| 5,743,715 | A | | 4/1998 | Staroselsky | |
| 6,308,531 | B1 | | 10/2001 | Roberts | |
| 6,332,336 | B1 | * | 12/2001 | Mirsky et al. | 62/613 |
| 2005/0076656 | A1 | * | 4/2005 | Bodell et al. | 62/83 |

OTHER PUBLICATIONS

A paper—10 pages—presented at the 2007 LNG 14 conference, entitled "Technical Challenges During the Engineering Phases of the Qatargas II Large LNG Trains" by Chavez, et al.
Manual entitled "Series 5 Antisurge Control Application for Centrifugal and Axial Compressors" Publication UM5411 (2.8.0) by Compressor Controls Corporation—200 pages.

* cited by examiner

*Primary Examiner* — Devon Kramer
*Assistant Examiner* — Bryan Lettman
(74) *Attorney, Agent, or Firm* — Sturm & Fix LLP

(57) ABSTRACT

A control method and apparatus for critical rotational speed avoidance in a compressor-expander set in a gas refrigeration system. By varying an opening of an antisurge or recycle valve, a shaft power used by the compressor in the compressor-expander set may be varied, thereby varying the rotational speed of the compressor-expander set to move it away from its critical speed zone. Additionally, a feedforward signal may be provided by a compressor-expander set control system to cause an antisurge valve for a recycle compressor to open upon a trip or shutdown of one compressor-expander set.

17 Claims, 10 Drawing Sheets

*Fig. 2a*
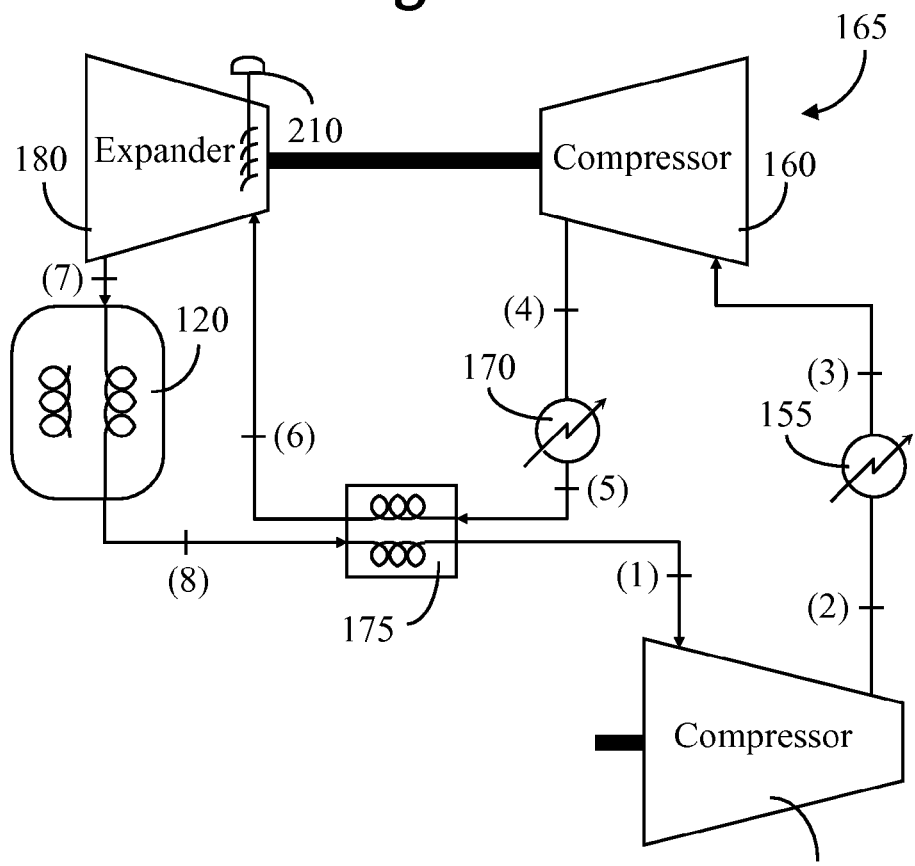
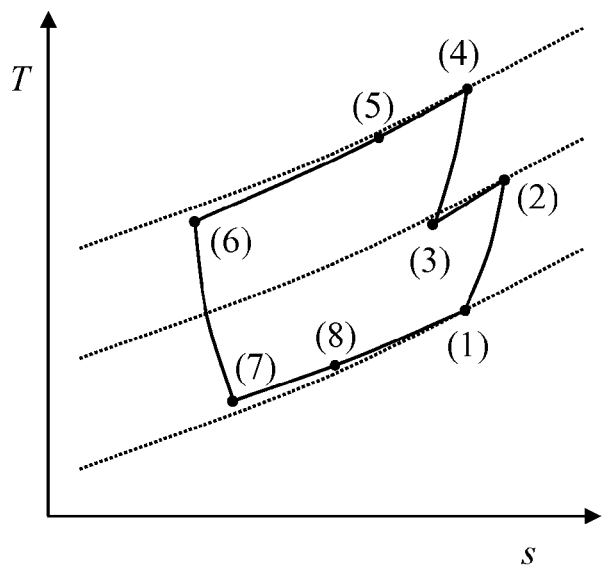
*Fig. 2b*

COMPRESSOR-EXPANDER SET CRITICAL SPEED AVOIDANCE

BACKGROUND OF THE INVENTION

1. Field of the Invention

The present invention relates generally to a control scheme. More particularly the present invention relates to a method and apparatus for limiting a time of operation in a critical speed zone of turbomachinery. This invention also relates to an antisurge scheme for a recycle compressor when a compressor-expander set trips.

2. Background Art

Most turbomachines, such as compressors, gas turbines, steam turbines, and expanders inherently exhibit at least one critical speed where the rotational speed of the turbomachine excites a natural frequency of the turbomachine. Extended operation at such critical speeds must necessarily be avoided.

When the critical speed or speeds reside below the normal operating region of the turbomachine, a startup procedure involving high angular accelerations through the critical speed or speeds is carried out, thus minimizing the time of operation in a neighborhood of the critical speed or speeds. This neighborhood around a critical angular or rotational speed is known as a "critical rotational speed zone," and is thus defined for the purposes of this application, including the claims. Critical speed zones for a particular turbomachine are disclosed by the turbomachine manufacturer.

Critical speed zones residing within the normal operating speed range of a particular turbomachine are less common than those residing outside this normal operating speed range.

An improved cryogenic process for liquefying natural gas is disclosed in U.S. Pat. No. 6,308,531 by Roberts et al., and is hereby incorporated in its entirety by reference. The process is also described in a paper presented at the 2007 LNG 14 conference. The title of this paper is "Technical Challenges during the Engineering Phases of the Qatargas II Large LNG Trains" by Chavez et al., which is also hereby incorporated in its entirety by reference. The improved process includes a gas refrigeration cycle using nitrogen for a refrigerant. As is well known to those of ordinary skill in this art, a gas refrigeration cycle makes use of a compressor and an expander or turbine. The expander is used to drop the pressure of the gas, but also serves to extract energy from the refrigerant via shaft power. Shaft power derived from the expander is used to provide at least a portion of the required refrigerant compressor power. Gas refrigeration cycles are covered in many undergraduate thermodynamics textbooks such as *Fundamentals of Engineering Thermodynamics* $6^{th}$ ed. by Moran and Shapiro, John Wiley & Sons, Inc., publishers, ISBN-13: 978-0471-78735-8 which is hereby incorporated in its entirety by reference.

The gas refrigeration cycle used for producing Liquid Natural Gas (LNG) in the Roberts et al. process is a regenerative cycle. That is, a heat exchanger is used to cool the high pressure stream upstream of the expander using the relatively cold low pressure stream downstream of the cooling load.

A departure from text-book gas refrigeration cycles in the Roberts et al. LNG application is the use of a first compressor, driven by the expander, and a second compressor driven by a separate driver. Because of the energy provided by the second compressor to the gas stream, the expander produces sufficient power to fully drive the first compressor.

The gas refrigeration cycle of the Roberts et al. LNG process is the coldest of a plurality of cascaded refrigeration cycles. Hence, the gas refrigeration cycle is used to subcool the liquid natural gas below its saturation temperature.

Typically, a plurality of gas refrigeration cycles, arranged in parallel, is used in the LNG process. The compressors in the compressor-expander sets may be operated using a load-sharing algorithm such as those disclosed in U.S. Pat. No. 5,743,715 to Staroselsky et al., which is hereby incorporated in its entirety by reference.

Turbocompressors generally experience unstable operation at low flow rates. The instability takes the form of either stall or surge, with surge being the most common for industrial compressors. In surge, the flow through the compressor suddenly reverses direction. This results in large thrust loads that can damage thrust bearings and cause vanes to contact the compressor shroud. Relatively hot gases from the discharge side of the compressor are drawn back into the compressor where more energy is added from the rotor, increasing the gas temperature even more. Repeated surge is to be avoided. Surge control algorithms are described in the Compressor Controls Series 5 Antisurge Control Application Manual . . . Publication UM5411 rev. 2.8.0 December 2007, herein incorporated in its entirety by reference.

A control system for the refrigeration processes in the Roberts et al. LNG process is needed. A challenging aspect for this control system is avoidance of critical speeds for the compressor-expander sets used in the gas refrigeration loop. These compressor-expander sets typically have a plurality of critical speed zones, some of which reside within the normal operating speed range of the compressor-expander sets. Extended operation in these critical speed zones must be avoided, but the gas refrigeration process must not be disrupted.

When a compressor-expander set trips or is shut down for any reason, including that of residing too long in a critical rotational speed zone, the second compressor, driven by a separate driver, may be pushed toward surge.

There is, therefore, a need for an improved control system for a compressor-expander set.

BRIEF SUMMARY OF THE INVENTION

A purpose of the present invention is to provide a method and apparatus for avoiding operating a compressor-expander set in a critical speed zone longer than a predetermined time while maintaining the process at its set point or set points.

The following description assumes a gas refrigeration cycle wherein the refrigerant is nitrogen, a representative process in which a compressor-expander set is used. The instant control method and apparatus is by no means limited to gas refrigeration cycles or to a particular fluid used in the system.

Most often, a plurality of compressor-expander sets is provided to produce the nitrogen mass flow rate needed to subcool the natural gas feed stock.

The expander in each compressor-expander set is constructed with variable geometry, often adjustable nozzles. The position of the adjustable nozzles is the manipulated variable used to maintain the total nitrogen mass flow rate at a desired set point. The rotational, or angular, speed of the compressor-expander set varies based on the refrigeration load.

While the adjustable nozzles of the plurality of expanders are collectively manipulated to maintain the total mass flow rate, each individual compressor-expander set may be operated at a rotational speed providing a desired operating condition of the compressor. In particular, it is usually undesirable for one compressor to be operating on its surge control line while another compressor is operating away from its surge control line. It is almost always less efficient for one compressor to require recycle to avoid surge when another is not recycling compared to increasing the low-flow compressor's flow rate so no recycle is needed while decreasing the high-flow compressor's flow rate as long as that reduction does not result in recycle.

Therefore, the instant invention calls for manipulation of the expanders' adjustable nozzles to cause the operating points of the compressors to reach their surge control lines simultaneously. Once recycle begins, recycle flow rate or recycle valve opening may be used to balance the operation of the compressors.

The compressor in each compressor-expander set is outfitted with a recycle or antisurge valve. When the recycle valve is opened, gas is permitted to travel from the high pressure discharge side of the compressor to the low pressure suction side through the valve, thus increasing the flow rate through the compressor. The recycle valve is used as the manipulated variable by an antisurge control system to avoid operation in the compressor's unstable surge region.

For most centrifugal compressors over most of the operating range, increased flow rate corresponds to increased power required to drive the compressor. Accordingly, when the recycle valve is opened, the power needed to drive the compressors increases. Even when increased flow rate results in reduced power requirement, such as is common for axial compressors, opening the recycle valve results in a change (a decrease) in power required. Therefore, the recycle valve can be used to predictably vary the rotational speed of the compressor-expander set, even while the expander mass flow rate is maintained at a constant value.

A novel use of the compressor's recycle valve is that of critical speed zone avoidance. If a compressor-expander set enters one of its critical speed zones, the automatic control system will open the compressor's recycle valve to increase the compressor's flow rate, usually slowing the rotational speed of the compressor-expander set out of its critical speed zone.

An additional object of this invention is the use of a feedforward signal to signal the nitrogen recycle compressor's control system of a compressor-expander set trip. That is, if a compressor-expander goes into shutdown expectedly or unexpectedly, the nitrogen recycle compressor may be driven toward surge. By signaling the nitrogen recycle compressor's control system to open the nitrogen recycle compressor's recycle valve, surge of the nitrogen recycle compressor can be avoided.

The novel features which are believed to be characteristic of this invention, both as to its organization and method of operation together with further objectives and advantages thereto, will be better understood from the following description considered in connection with the accompanying drawings in which a presently preferred embodiment of the invention is illustrated by way of example. It is to be expressly understood however, that the drawings are for the purpose of illustration and description only and not intended as a definition of the limits of the invention.

BRIEF DESCRIPTION OF THE SEVERAL VIEWS OF THE DRAWINGS

FIG. 2a is a detail schematic of the gas refrigeration cycle;

FIG. 2b shows a temperature-entropy diagram for the gas refrigeration cycle;

DETAILED DESCRIPTION OF THE INVENTION

Figure 1:
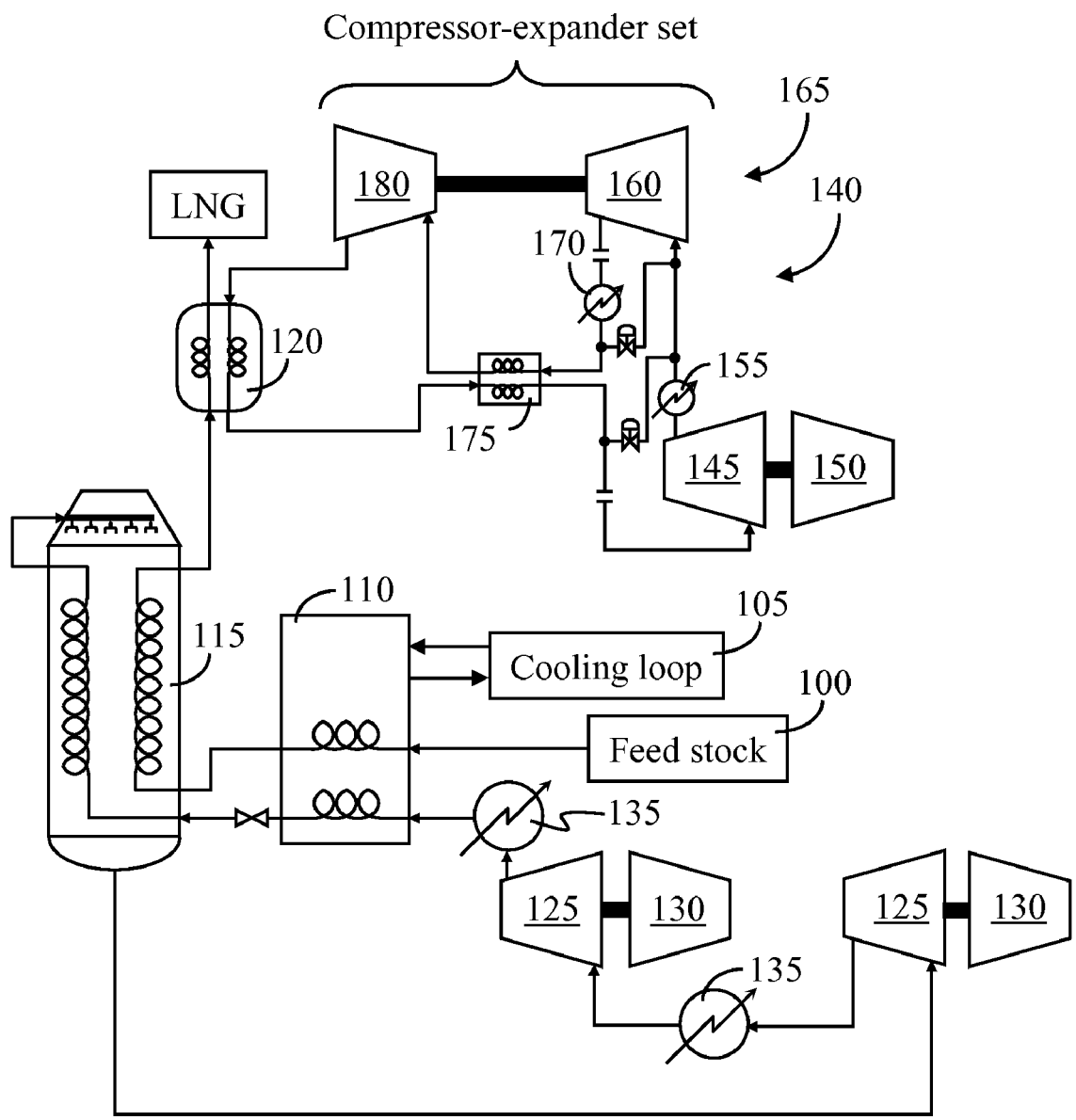
FIG. 1 is a simplified schematic of a portion of a LNG refrigeration system.

Referring to FIG. 1, feed stock 100, for this example, natural gas, is first dehydrated (not shown) and the heavy components removed (not shown). A relatively high temperature cooling loop 105 (or plurality of loops) such as a propane refrigeration loop, is used to lower the temperature of the gaseous feedstock 100 in a high temperature heat exchanger 110.

The feedstock 100 then enters a main heat exchanger 115, where the remainder of the sensible heat is removed, and at least some of the latent heat is also removed from the feedstock 100. The feedstock 100 is further cooled in a subcooling heat exchanger 120 where the temperature of the feedstock 100 is lowered below the saturation temperature. At this point, with very little additional processing, the pressure of the liquid natural gas is dropped and the LNG stream is directed to storage.

The refrigeration loop providing the low temperature stream in the main heat exchanger 115 is often a mixed refrigerant (MR) refrigeration system. Two stages of compression 125 in series, each compression stage 125 with its own driver 130 are shown in the schematic of FIG. 1. Typical drivers 130 include gas turbines and steam turbines. Although typical, the depicted arrangement is not universal. Heat is rejected to the ambient (air or water) by two ambient MR heat exchangers 135. Cooling of the MR to a lower temperature occurs in the high temperature heat exchanger 110.

The cold MR stream is passed through the main heat exchanger 115 where heat is transferred from the feedstock 100 stream to the MR stream.

Cascaded with the MR refrigeration loop is at least one gas refrigeration loop 140. The refrigerant in a typical gas refrigeration loop 140 for LNG production is pure nitrogen ($N_2$). A nitrogen recycle compressor 145 is driven by a driver 150, such as a gas turbine. The rotational speed of the nitrogen recycle compressor 145 is typically variable. Referring now to FIGS. 2a and 2b, as well as FIG. 1, the nitrogen recycle compressor 145 brings the pressure of the nitrogen refrigerant from its lowest pressure [state (1)] to an intermediate pressure [state (2)], where heat is rejected from the nitrogen stream to the ambient in a first nitrogen ambient heat exchanger 155. The pressure, p, tends to drop from state (2) to state (3), through the first nitrogen ambient heat exchanger 155 as seen in FIG. 2b where the dotted curves represent constant pressure curves. Additionally, the temperature, T, decreases and entropy, s, is transferred out of the nitrogen stream with the heat.

From the outlet [state (3)] of the first nitrogen ambient heat exchanger 155, the nitrogen refrigerant passes through the compressor 160 in the compressor-expander set 165, where the pressure of the nitrogen stream is increased to its greatest value [state (4)].

The nitrogen stream then passes through a second nitrogen ambient heat exchanger 170 [state (4) to state (5)]. Here the pressure again drops slightly, the temperature, T, decreases, and entropy, s, is transferred out of the stream with the heat, all depicted in FIG. 2b. More heat and entropy are transferred out of the nitrogen in a regenerative heat exchanger 175. The heat transferred out of the stream from state (5) to state (6) enters the relatively lower temperature stream from state (8) to state (1). Note, again, in FIG. 2b, the temperature, T, pressure, p, and entropy, s, all decrease in the regenerative heat exchanger 175 from state (5) to state (6).

The nitrogen stream is expanded from state (6) to state (7) in the expander 180 of the compressor-expander set 165. As shown, the expander 180 is outfitted with adjustable nozzles 210. At the discharge of the expander 180 [state (7)], the temperature reaches its lowest value, as clearly seen in FIG. 2b.

The subcooling heat exchanger 120 is encountered next, where the nitrogen stream passes from state (7) to state (8), gaining heat and entropy from the feedstock 100 stream. The temperature, T, of the nitrogen stream increases from state (7) to state (8), while the pressure, p, decreases due to friction.

Due to the relatively low temperature, T, of the nitrogen stream at state (8), the stream can be used in the regenerative heat exchanger 175 to reduce the temperature of the nitrogen stream from state (5) to state (6). The nitrogen stream entering the regenerative heat exchanger at state (8) exits at state (1). The process from state (8) to state (1) involves an increase in heat, entropy, s, and temperature, T, and a decrease in pressure, p.

Figure 3:
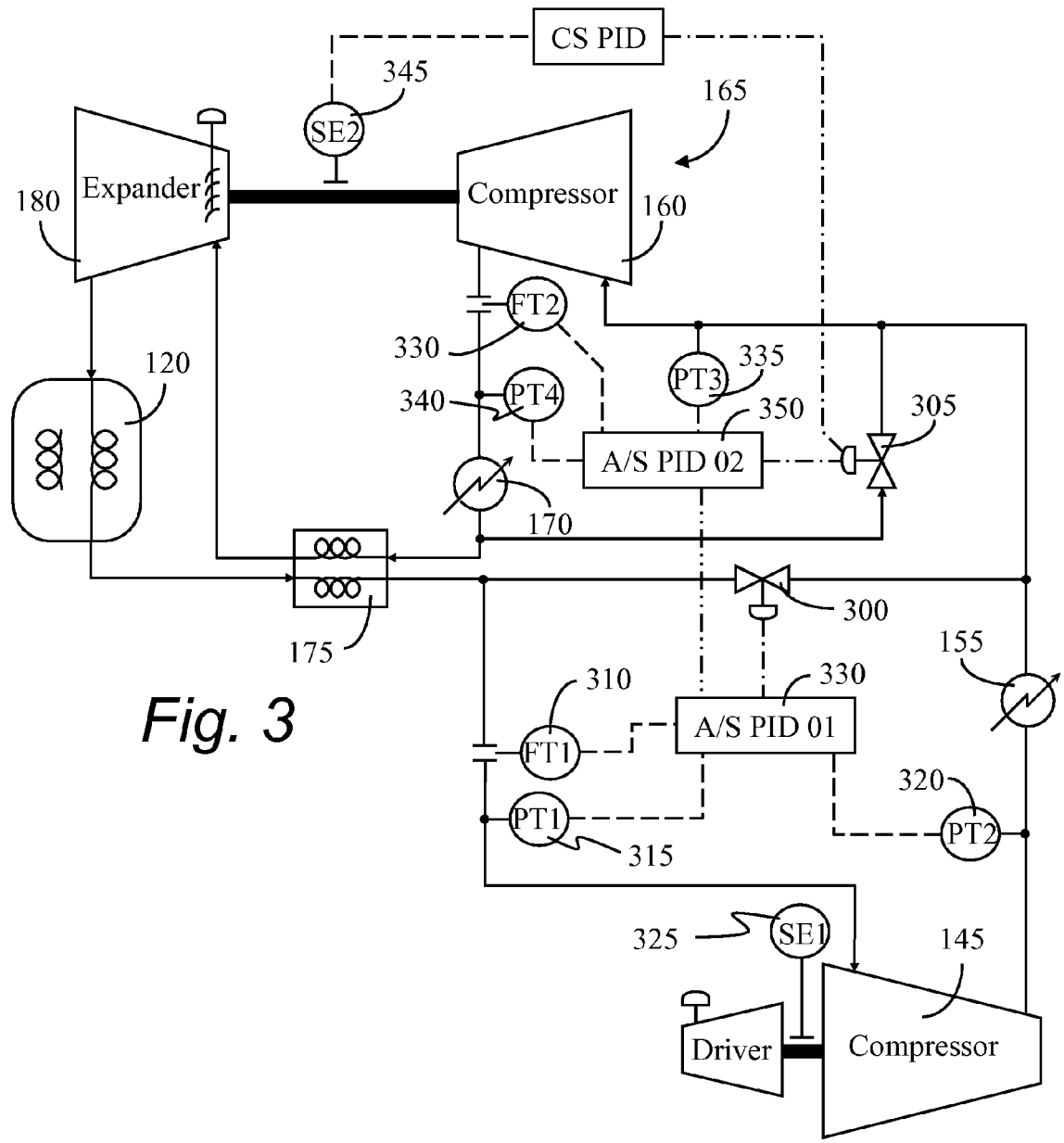
FIG. 3 is a detail schematic of the gas refrigeration cycle with instrumentation used in the LNG process.

In FIG. 3, details of a control system are included, along with the refrigeration equipment shown in FIGS. 1 and 2a. Recycle, or antisurge, valves 300, 305 are provided for the nitrogen recycle compressor 145 and the compressor 160 of the compressor-expander set 165, respectively. The recycle valves 300, 305 are used to vary the flow rate of the nitrogen through these compressors 145, 165. Surge avoidance in the nitrogen recycle compressor 145 is effected by the manipulation of the first recycle valve 300. In the compressor of the compressor-expander set, antisurge control is effected through the manipulation of the second recycle valve 305.

In a typical LNG process, measured data are displayed, used for alarms, and for automatic control. Some of the transmitters used for the recycle compressor 145 include: a flow transmitter, FT1 310, a suction pressure transmitter, PT1 315, a discharge pressure transmitter, PT2 320, and a rotational speed transmitter, SE1 325. The flow transmitter, FT1 310 is shown on the suction side of the recycle compressor 145 in FIG. 3, but the present invention is not limited thereto.

Signals from the recycle compressor flow transmitter, FT1 310, suction pressure transmitter, PT1 315, and discharge pressure transmitter, PT2 320 are read into an antisurge control system, A/S PID 01 330, where an automatic control algorithm, preferably a Proportional, Integral, Differential (PID) algorithm, is used to keep the recycle compressor from surging. The recycle compressor recycle valve 300 is manipulated by the antisurge control system, A/S PID 01 330.

Some of the transmitters used for the compressor 160 of the compressor-expander set 165 include: a flow transmitter, FT2 330, a suction pressure transmitter, FT3 335, a discharge pressure transmitter, FT4 340, and a rotational speed transmitter, SE2 345. The flow transmitter, FT2 330 is shown on the discharge side of the compressor 160 in FIG. 3, but the present invention is not limited thereto.

Signals from the compressor-expander set compressor flow transmitter, FT2 330, suction pressure transmitter, PT3 335, discharge pressure transmitter, PT4 340 are read into a second antisurge control system, A/S PID 02 350, where an automatic control algorithm is used to keep the recycle compressor from surging. The compressor-expander set compressor recycle valve 305 is manipulated by the antisurge control system, A/S PID 02 350.

Note that redundant transmitters are not shown in FIG. 3. However, redundant transmitters are common in LNG processes.

Figure 4:
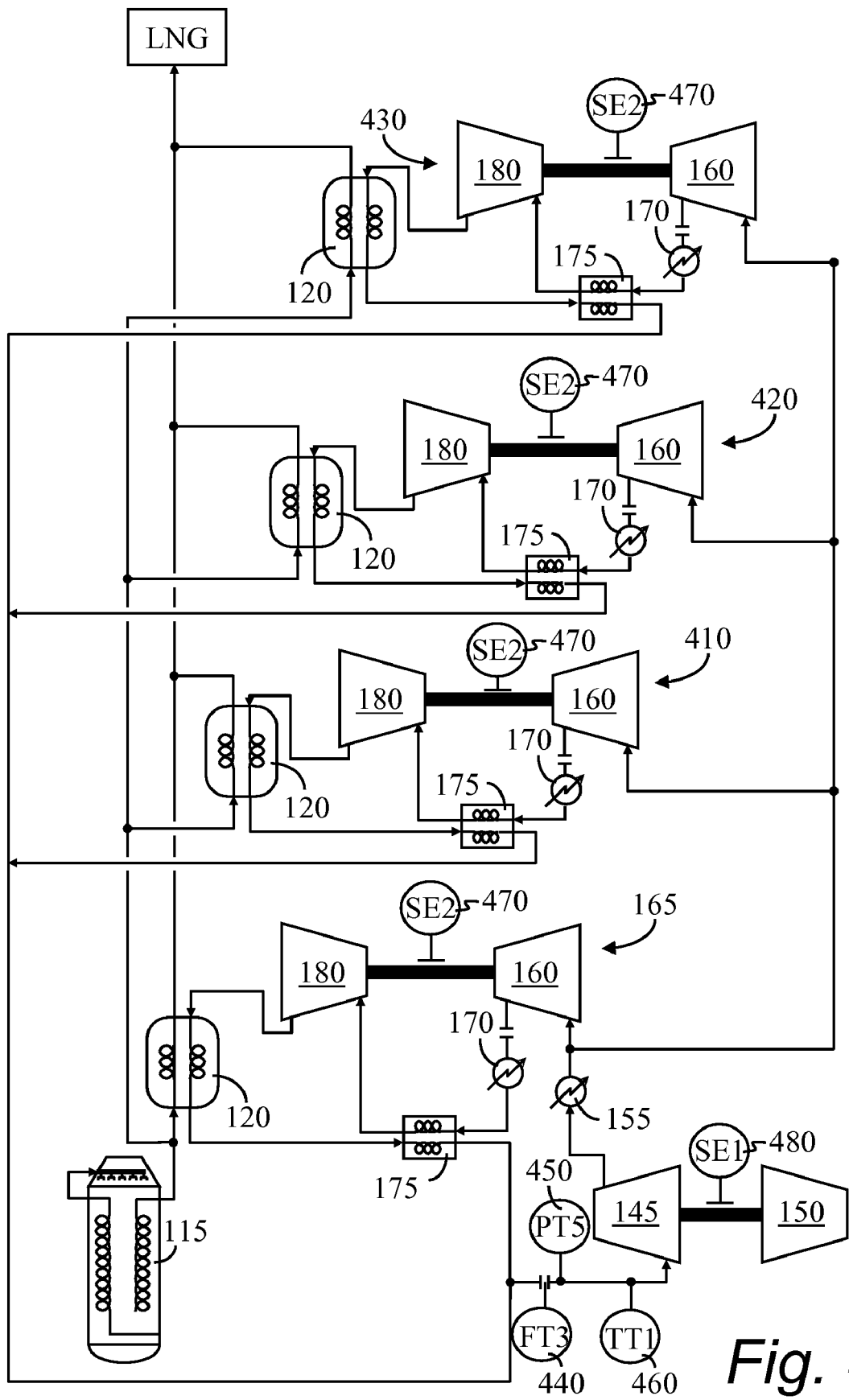
FIG. 4 is a schematic of a LNG refrigeration system comprising a plurality of gas refrigeration compressor-expander sets, each communicating with its own heat exchanger.
Figure 5:
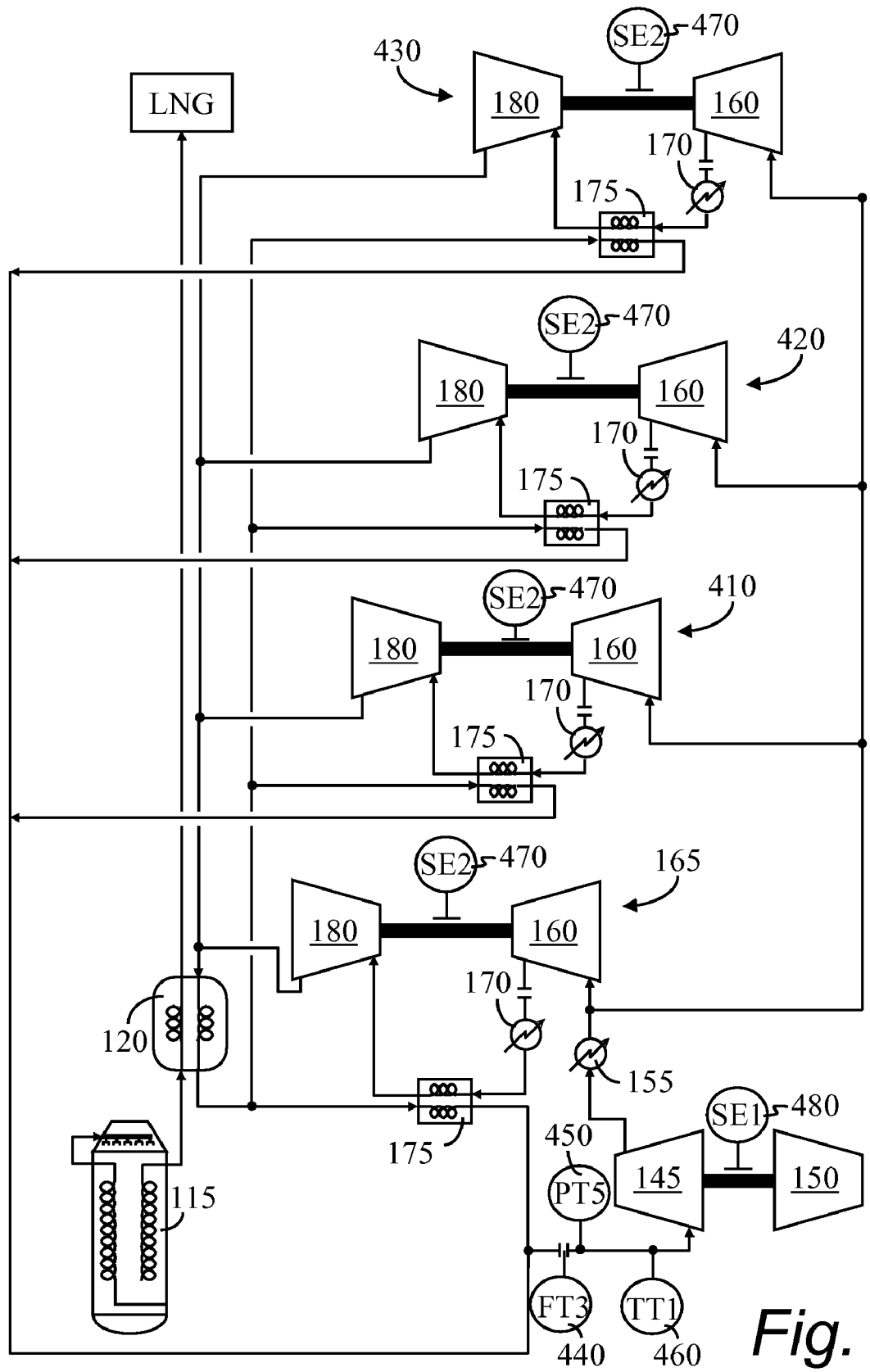
FIG. 5 is a schematic of a LNG refrigeration system comprising a plurality of gas refrigeration compressor-expander sets, all communicating with a common heat exchanger.

A single compressor-expander set 165 is shown in each of FIGS. 1, 2a and 3. Usually, however, multiple compressor-expander sets 165 are provided and often arranged in parallel, serviced by a single nitrogen recycle compressor 145 as shown in FIGS. 4 and 5. In FIGS. 4 and 5, four (4) compressor-expander sets 165, 410, 420, 430, are shown operating in parallel with one another. In FIG. 4 each compressor-expander set 165, 410, 420, 430 is associated with its own subcooling heat exchanger 120. The plurality of subcooling heat exchangers 120 are arranged in series on the LNG side, thus energy is removed from the product 100 consecutively in each of the subcooling heat exchangers 120. All the compressor-expander sets 165, 410, 420, 430 share a single subcooling heat exchanger 120 in FIG. 5. The present invention is not limited to either of these subcooling heat exchanger arrangements.

The sum of the mass flow rates of the nitrogen in all the compressor-expander sets 165, 410, 420, 430 is determined using the signals received from the flow transmitter, FT3 440, the pressure transmitter, PT5 450, and the temperature transmitter, TT1 460. The nitrogen is always superheated at the position of these transmitters, so the pressure and temperature are independent thermodynamic properties. Hence, the density, $\rho$, of the nitrogen gas may be evaluated as $\rho=\rho(p,T)$ and the mass flow rate, $\dot{m}$, is obtained by:

$$\dot{m}=\rho Q=A\sqrt{\rho \Delta p}$$

where A is a constant associated with a differential pressure flow meter and $\Delta p$ is the signal received from the flow transmitter 440. The resulting mass flow rate, mt, is used in an automatic control algorithm such as a PID loop as shown in FIG. 6a.

Figure 6A:
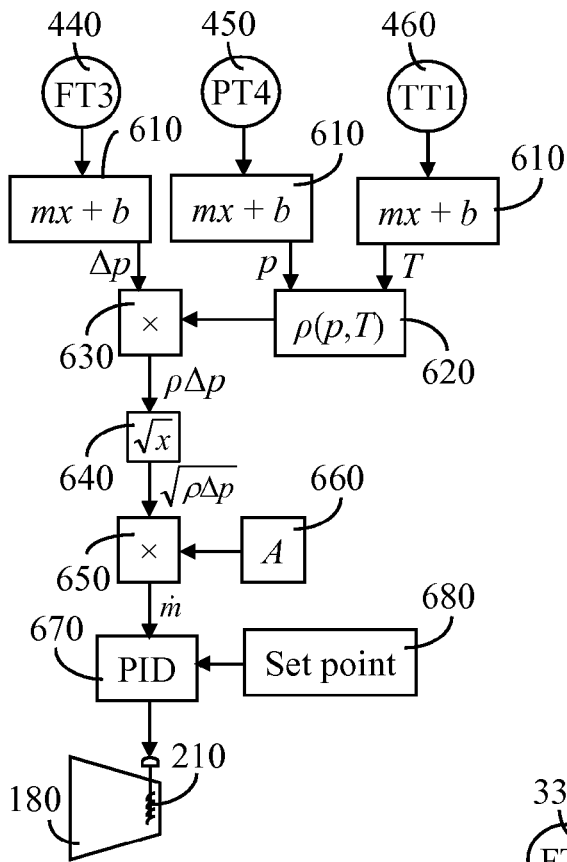
FIG. 6a is a flow diagram representing a mass flow control system.

Referring to FIG. 6a, the raw signals from the transmitters 440, 450, 460 may need to be scaled and an offset accommodated as shown in blocks 610 to obtain actual values of pressure differential, $\Delta p$, pressure, p, and temperature, T.

The pressure, p, and temperature, T, values are used in the function block 620 for calculating the density, $\rho$, of the nitrogen as a function of pressure, p, and temperature, T.

A first product block 630 is used to calculate the product of the pressure differential, $\Delta p$, and density, $\rho$. Then the square root of the product is found in the square root block 640.

A second product block 650 resolves the product of the square root of the product of the pressure differential, $\Delta p$, and density, $\rho$ and the constant, A 660. The result of the second product block 650 is the calculated mass flow rate, $\dot{m}$, of the nitrogen. The mass flow rate, $\dot{m}$, is used as the process variable in the mass flow rate PID loop 670. The set point 680 is preferably provided by a supervisory or optimizing control system, but also may be entered by an operator or field engineer. The output of the mass flow rate PID loop 670 is directed to the adjustable nozzles 210 of one or more of the expanders 180 in the compressor-expander sets 165, 410, 420, 430.

Figure 6B:
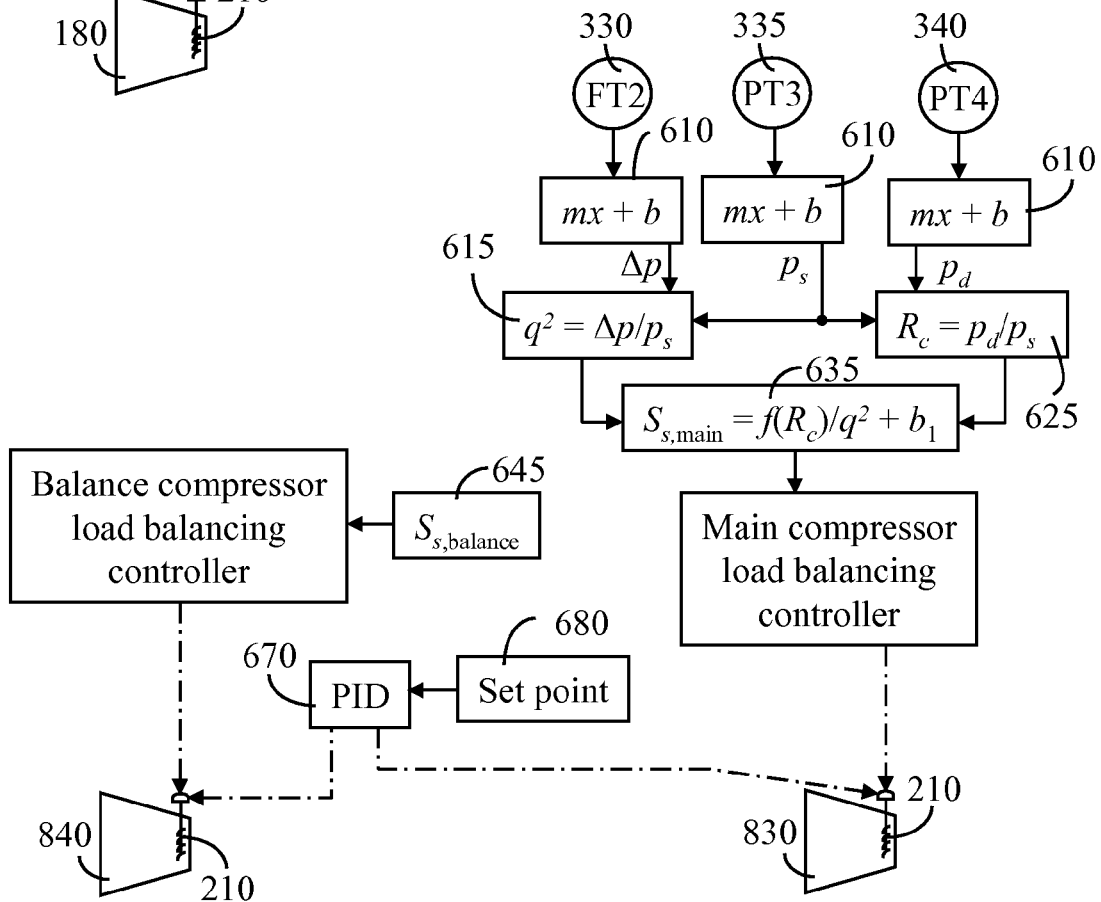
FIG. 6b is a flow diagram representing load sharing and load balancing control.

In FIG. 6b, the transmitters associated with the main compressor: flow transmitter, FT2 330, suction pressure transmitter PT3, 335, and discharge pressure transmitter PT4, 340 may need to be scaled and an offset accommodated as shown in blocks 610 to obtain actual values of pressure differential, $\Delta p$, suction pressure, $p_s$, and discharge pressure, $p_d$.

In a first division block 615, the pressure differential, $\Delta p$, and the suction pressure, $p_s$, are combined to produce a dimensionless flow parameter denoted here as $q^2$. In a second division block 625, the discharge pressure, $p_d$, and the suction pressure, $p_s$, are combined to produce a dimensionless pressure ratio denoted here as $R_c$.

The values of $q^2$ and $R_c$ are combined to produce a measure of proximity to a surge control line, $S_s$, in a function block 635.

An identical process is carried out, using sensors and transmitters associated with the balance compressor, to calculate a measure of proximity to a surge control line, $S_s$, for the balance compressor as indicated by the $S_{s,balance}$ block 645. The two values of proximity to the surge control line, $S_{s,main}$, and $S_{s,balance}$ are used in the respective antisurge control systems to protect these two compressors from surge. These same values may be used by a load sharing and balancing control system, whereby the rotational speeds of the respective compressors are manipulated via the expander adjustable nozzles 210. The overall performance of the combined system is controlled by the mass flow rate PID loop 670, which maintains the mass flow rate at its set point.

Figure 7A:
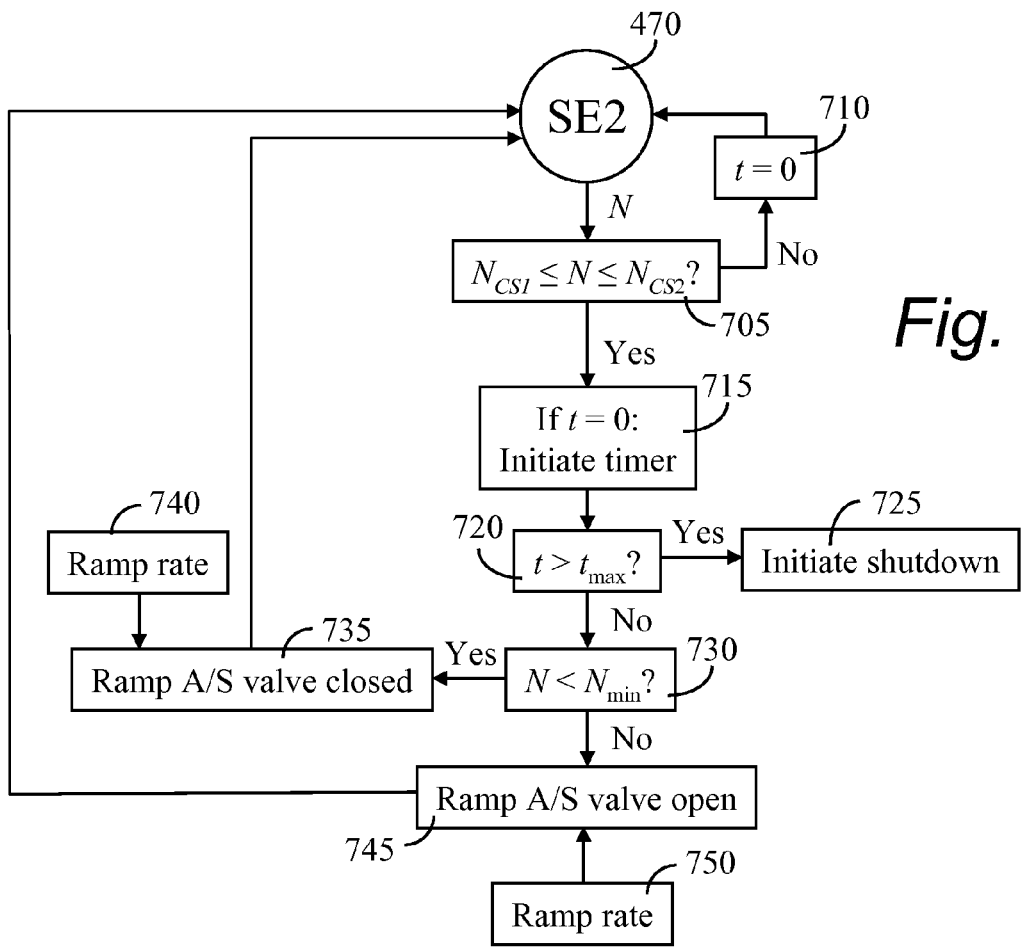
FIG. 7a is a flow diagram for critical speed avoidance.

A flow diagram outlining the critical speed avoidance algorithm is shown in FIG. 7a. A rotational speed transmitter 470 is provided to each of the compressor-expander sets 165, 410, 420, 430. The critical speed avoidance control system receives a rotational speed signal, N, from the rotational speed transmitter 470. A test is made in a first comparator block 705 to determine if the rotational speed signal, N, resides between the low boundary CS1 and the high boundary CS2 of the critical speed zone, and therefore indicates critical speed avoidance is needed. If the result of the first comparator block 705 is false, a timer is set to t=0 in timer set block 710 and the rotational speed, N, continues to be monitored.

The first instance the result of the first comparator block 705 is true, the timer is initiated 715. Any time the result of the first comparator block 705 is true, the time reported by the timer is compared to a predetermined maximum time, $t_{max}$, the compressor-expander set 410 will be permitted to operate in the critical speed zone. This operation is carried out in block 720. If the maximum time, $t_{max}$, time has been exceeded, the control system will initiate an orderly shutdown of the compressor expander set 410 as shown in shutdown block 725. As long as the maximum time limit, $t_{max}$, has not been exceeded, a determination is made in a second comparator block 730 whether the compressor-expander set 410 rotational speed, N, is less than the minimum operational speed—and is therefore in startup mode. If the result of the second comparator block 730 is true, the recycle valve 305 associated with the compressor 160 in the compressor-expander set 410 is ramped closed 735 at a predetermined ramp rate 740 until either of the results of the first comparator block 705 or the second comparator block 730 is false. It should be noted that, typically, the recycle valve 305 is held open on startup.

If the result of the second comparator block 730 is false when the result of the first comparator block 705 is true, it is concluded the compressor-expander set 410 rotational speed, N, is within the normal operating range. In this case, the recycle valve 305 is ramped open 745 at a predetermined ramp rate 750 until the result of the first comparator block 705 is false.

Figure 7B:
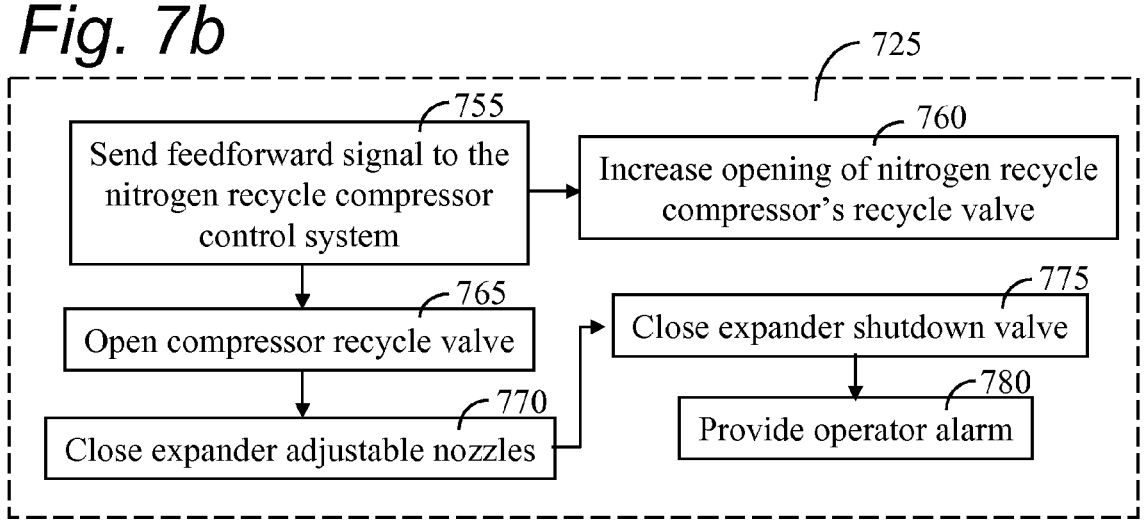
FIG. 7b is a detail flow diagram of a shutdown sequence.

The shutdown block 725 is expanded in a representative shutdown procedure in FIG. 7b. Such a procedure is used regardless of the reason for the shutdown. As those of ordinary skill in this art are well aware, a shutdown may be planned in advance, or it may be an emergency shutdown due to a sensed condition demanding immediate shutdown.

Referring now to FIG. 7b, to keep the nitrogen recycle compressor 145 from surging upon a trip of one of the compressor-expander sets 165, 410, 420, 430, a feedforward signal is provided to the nitrogen recycle compressor's control system, A/S PID 01, 330. This step is shown in feedforward block 755. The nitrogen recycle compressor's control system 330 will act to increase the opening of the nitrogen recycle compressor's antisurge valve 300, as shown in the resultant block 760, when it receives this feedforward signal. The increase in opening may be a predetermined, fixed amount, or the increase may be calculated based on operating parameters of the nitrogen recycle compressor 145 and/or the tripped compressor-expander set 165, 410, 420, 430.

Other steps in the shutdown procedure, not necessarily in the order in which they will be carried out include: opening the compressor-expander set compressor 160, 810, 820 recycle valve as shown in the recycle block 765; closing the expander adjustable nozzles 210 as indicated in the nozzle block 770; closing the expander shutdown valve 850 or 860 as illustrated in the shutdown valve bock 775; and alarming the operator of the shutdown 780. The order in which these steps are carried out depends on the system, rates of actuation, and personal preference.

Figure 8:
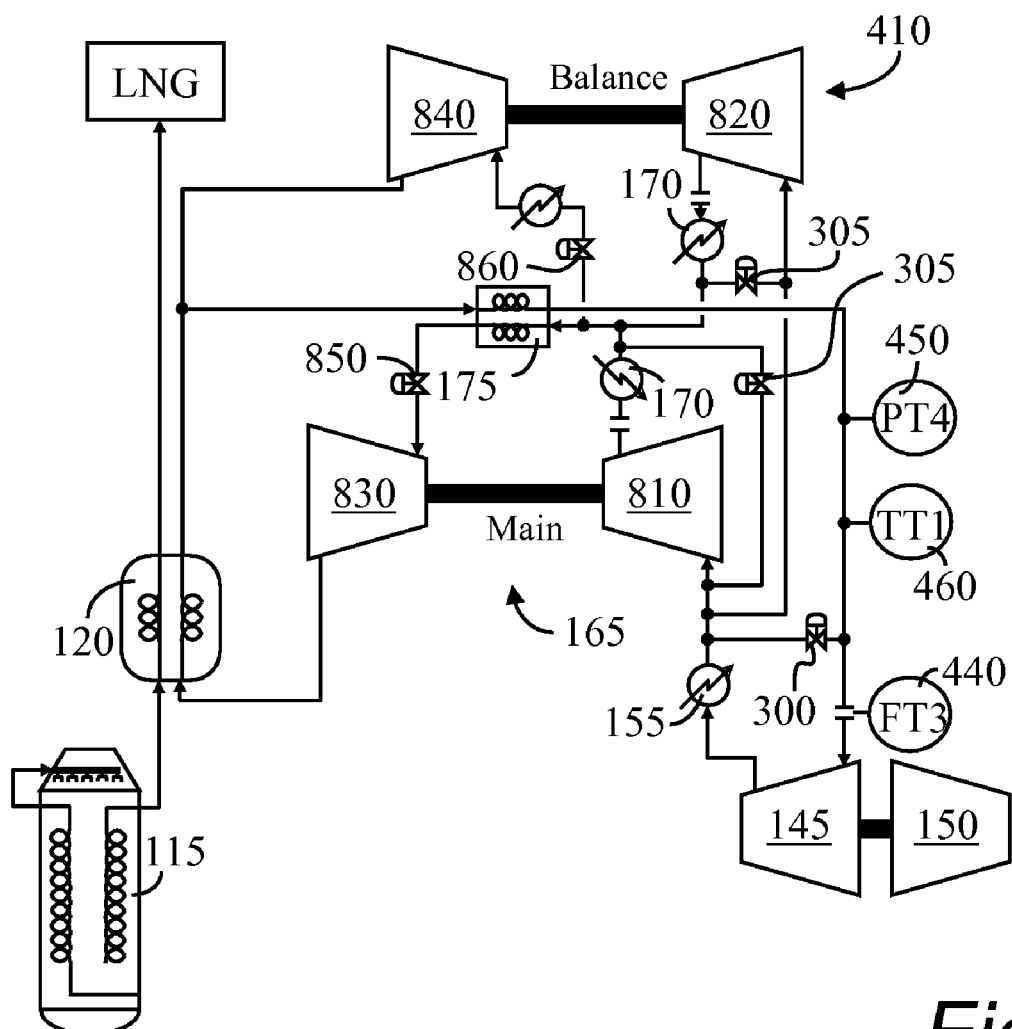
FIG. 8 is a schematic of a preferred gas refrigeration system for subcooling liquid natural gas.

In FIG. 8, a preferred piping system is illustrated. In this piping arrangement, the compressors 810, 820 within the main and balance compressor-expander sets, respectively, are plumbed in parallel. The expanders 830, 840, on the other hand, are not in parallel with one another. Rather, the main expander 830 feeds the subcooling heat exchanger 120, while the exhaust from the balance expander 840 is combined with the discharge of the subcooling heat exchanger 120, and the entire flow is used as the cold fluid in the regenerator 175. This piping arrangement is presented to provide a full disclosure of the systems on which the present invention may be used. However, the method and apparatus of the instant invention is unaffected by the known piping variations shown in FIGS. 1, 2a, 3-5, and 8.

Expander shutdown valves 850, 860 are provided for shutting down the main and balance compressor-expander sets.

Figure 9:
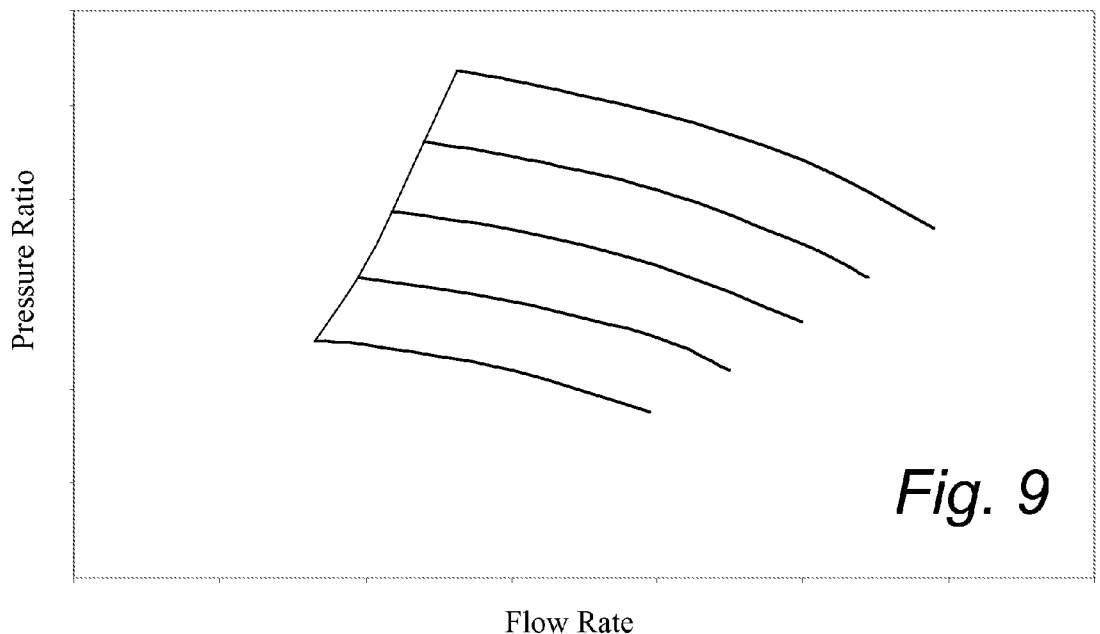
FIG. 9 is a compressor performance map for the main compressor in pressure ratio versus flow coordinates.
Figure 10:
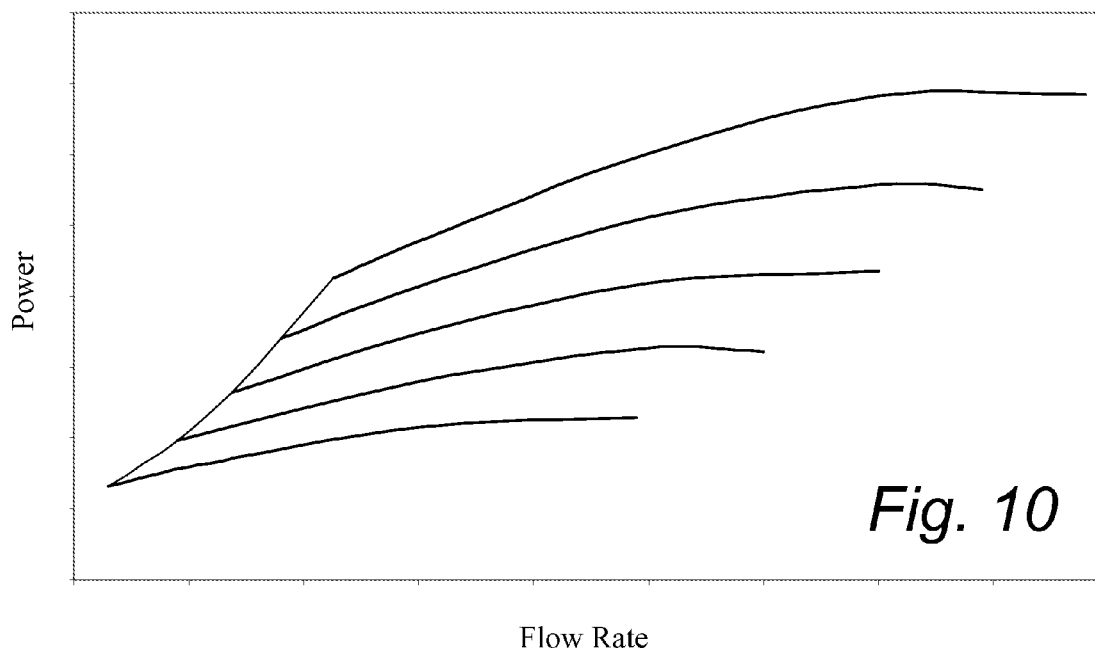
FIG. 10 is a compressor performance map for the main compressor in power versus flow coordinates.
Figure 11:
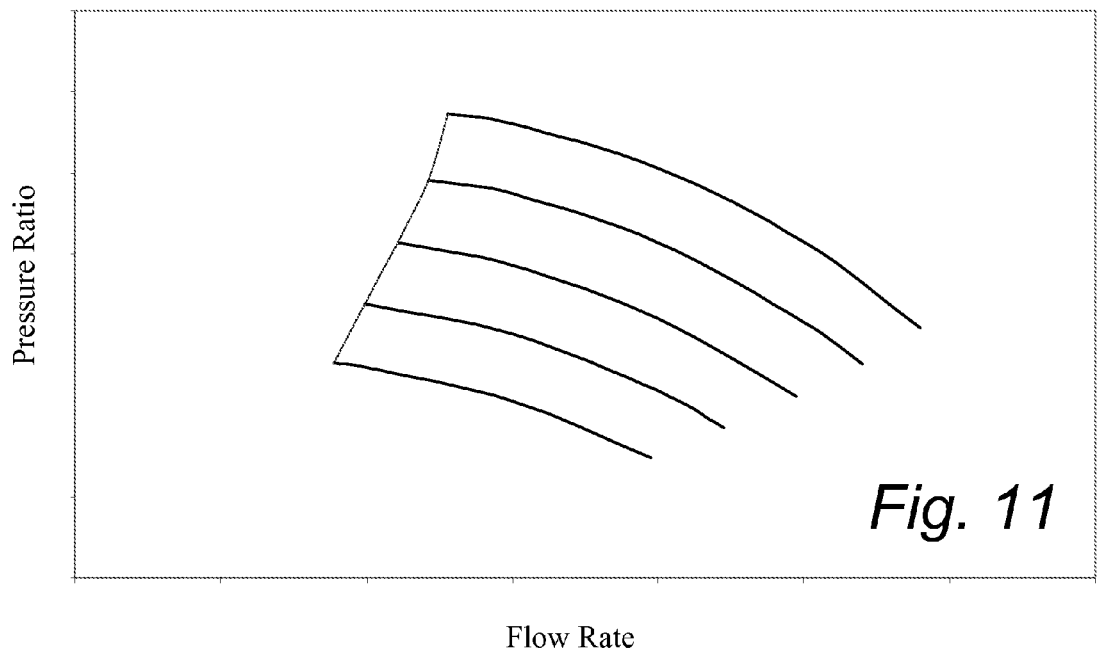
FIG. 11 is a compressor performance map for the balance compressor in pressure ratio versus flow coordinates.
Figure 12:
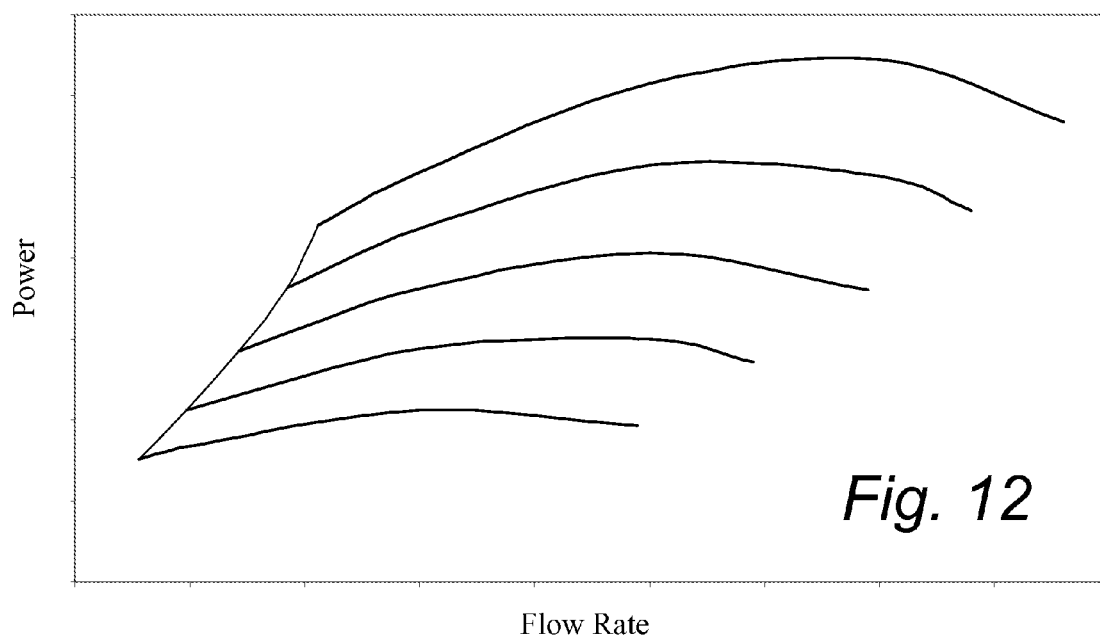
FIG. 12 is a compressor performance map for the balance compressor in power versus flow coordinates.

Performance maps for the main compressor 810 are shown in FIGS. 9 and 10. Performance maps for the balance compressor 820 are shown in FIGS. 11 and 12. As those skilled in this art know, for a given rotational speed, N, the shaft power required by a centrifugal compressor 160, 810, 820 often has a positive slope as shown in FIGS. 10 and 12. Frequently, as especially seen in FIG. 12, at high flow rates, the shaft power curve for a constant rotational speed, N, may have a negative slope. Either way, the shaft power required by the centrifugal compressors 160, 810, 820 changes with flow rate. Therefore, the shaft power varies with the opening of the recycle valve 305. The speed is governed by the equation:

$$\frac{1}{2}I\frac{dN^2}{dt} = \dot{W}_{in} - \dot{W}_{out} \qquad (1)$$

where I is the moment of inertia for the compressor-expander set 410, N is the rotational speed of the compressor-expander set 410, $\dot{W}_{in}$ is the shaft power supplied to the compressor 160, 810, 820, and $\dot{W}_{out}$ is the shaft power required by the compressor 160, 810, 820. Opening the recycle valve 305 changes $\dot{W}_{out}$, and hence the rotational speed, N. Therefore, changing the opening of the recycle valve 305 may be used to move the rotational speed, N, of the compressor-expander set 410 out of a critical speed zone.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. A method of critical speed avoidance for a compressor-expander set, the compressor-expander set comprising at least one expander connected to a shaft of at least one compressor, the at least one compressor being fitted with a recycle valve, the method comprising:
   (a) measuring a value related to a rotational speed of the compressor-expander set;
   (b) predetermining a range of values associated with a critical rotational speed zone;
   (c) comparing the value related to the rotational speed with the range of values associated with the critical rotational speed zone; and
   (d) changing a position of the recycle valve if the value related to the rotational speed falls within the range of values associated with the critical rotational speed zone.

2. The method of claim 1 wherein predetermining the range of values associated with the critical rotational speed zone comprises predetermining a plurality of ranges of values associated with a plurality of critical rotational speed zones.

3. The method of claim 1 wherein changing the position of the recycle valve if the value related to the rotational speed falls within the range of values associated with the critical rotational speed zone comprises:
   (a) predetermining a value related to a minimum operational rotational speed of the compressor-expander set;
   (b) comparing the value related to the rotational speed with the value related to the minimum operational rotational speed of the compressor-expander set; and
   (c) closing the recycle valve if the comparison of the value related to the rotational speed to the value related to the minimum operational rotational speed indicates the compressor-expander set is in a startup mode.

4. The method of claim 3 wherein closing the recycle valve comprises closing the recycle valve according to a predetermined ramp rate.

5. The method of claim 1 wherein changing the position of the recycle valve if the value related to the rotational speed falls within the range of values associated with the critical rotational speed zone comprises:
   (a) predetermining a value related to a minimum operational rotational speed of the compressor-expander set;
   (b) comparing the value related to the rotational speed with the value related to the minimum operational rotational speed of the compressor-expander set; and
   (c) opening the recycle valve if the comparison of the value related to the rotational speed to the value related to the minimum operational rotational speed indicates the compressor-expander set is in a normal operation mode.

6. The method of claim 5 wherein opening the recycle valve comprises opening the recycle valve according to a predetermined ramp rate.

7. The method of claim 1 wherein the at least one expander comprises adjustable nozzles, the method additionally comprising manipulating the expander adjustable nozzles to maintain a mass flow rate of a working fluid at a mass flow rate set point.

8. The method of claim 1 wherein the expander-compressor set comprises a plurality of expanders, each of the plurality of expanders having adjustable nozzles, the method additionally comprising:
   (a) manipulating the adjustable nozzles on all the plurality of expanders to maintain a mass flow rate of a working fluid at a mass flow rate set point; and
   (b) manipulating each expander's adjustable nozzles to control an associated compressor according to a load balancing set point.

9. The method of claim 1 additionally comprising:
   (a) measuring a length of time in which the value related to the rotational speed falls within the range of values associated with the critical rotational speed zone;
   (b) predetermining a maximum allowable time duration in which the value related to the rotational speed is permitted to reside within the range of values associated with the critical rotational speed zone;
   (c) comparing the measured length of time to the maximum allowable time duration; and
   (d) causing the compressor-expander set to shut down when the measured length of time exceeds the maximum allowable time duration.

10. An apparatus for critical speed avoidance for a compressor-expander set comprising:
    (a) at least one expander;
    (b) at least one compressor connected to a shaft of the at least one expander;
    (c) a recycle valve piped in parallel with the at least one compressor;
    (d) a rotational speed sensor for measuring a value related to a rotational speed of the compressor-expander set;
    (e) a first comparator for comparing the value related to the rotational speed with a range of values associated with a critical rotational speed zone; and
    (f) a control system for changing a position of the recycle valve if the value related to the rotational speed falls within the range of values associated with the critical rotational speed zone.

11. The apparatus of claim 10 wherein the control system for changing the position of the recycle valve if the value related to the rotational speed falls within the range of values associated with the critical rotational speed zone comprises:
    (a) a second comparator for comparing the value related to the rotational speed with a value related to a minimum operational rotational speed of the compressor-expander set; and
    (b) an actuator for closing the recycle valve if the comparison of the value related to the rotational speed to the value related to the minimum operational rotational speed indicates the compressor-expander set is in a startup mode.

12. The apparatus of claim 11 wherein the control system includes a ramp function for closing the recycle valve according to a predetermined ramp rate.

13. The apparatus of claim 10 wherein the control system for changing the position of the recycle valve if the value related to the rotational speed falls within the range of values associated with the critical rotational speed zone comprises:
(a) a second comparator for comparing the value related to the rotational speed with a value related to a minimum operational rotational speed of the compressor-expander set; and
(b) an actuator for opening the recycle valve if the comparison of the value related to the rotational speed to the value related to the minimum operational rotational speed indicates the compressor-expander set is in a normal operation mode.

14. The apparatus of claim 13 wherein the control system includes a ramp function for opening the recycle valve according to a predetermined ramp rate.

15. The apparatus of claim 10 additionally comprising:
(a) adjustable nozzles fitted to the at least one expander
(b) a mass flow control system to manipulate the expander adjustable nozzles to thereby maintain a mass flow rate of a working fluid at a mass flow rate set point.

16. The apparatus of claim 10 additionally comprising:
(a) a plurality of expanders, each of the plurality of expanders including adjustable nozzles;
(b) a mass flow control system to manipulate the adjustable nozzles on all the plurality of expanders to maintain a mass flow rate of a working fluid at a mass flow rate set point; and
(c) a load balancing control system to manipulate each one of the plurality of expander's adjustable nozzles to control an associated compressor according to a load balancing set point.

17. The apparatus of claim 10 additionally comprising:
(a) a timer to measure a length of time in which the value related to the rotational speed falls within the range of values associated with the critical rotational speed zone;
(b) a second comparator to compare the measured length of time to a maximum allowable time duration; and
(c) a signal to cause the compressor-expander set to shut down when the measured length of time exceeds the maximum allowable time duration.

* * * * *